(12) United States Patent
Luo

(10) Patent No.: US 9,731,874 B2
(45) Date of Patent: Aug. 15, 2017

(54) BUTTON-TYPE AIRTIGHT CONTAINER AND THE LID THEREOF

(71) Applicant: Cheng Luo, Guangdong Province (CN)

(72) Inventor: Cheng Luo, Guangdong Province (CN)

( * ) Notice: Subject to any disclaimer, the term of this patent is extended or adjusted under 35 U.S.C. 154(b) by 155 days.

(21) Appl. No.: 14/773,390

(22) PCT Filed: May 18, 2015

(86) PCT No.: PCT/CN2015/079144
§ 371 (c)(1),
(2) Date: Sep. 8, 2015

(87) PCT Pub. No.: WO2015/184950
PCT Pub. Date: Dec. 10, 2015

(65) Prior Publication Data
US 2016/0107805 A1    Apr. 21, 2016

(30) Foreign Application Priority Data
Jun. 5, 2014   (CN) .................... 2014 2 0298125 U

(51) Int. Cl.
*B65D 45/28* (2006.01)
*A47J 47/02* (2006.01)

(52) U.S. Cl.
CPC .............. *B65D 45/28* (2013.01); *A47J 47/02* (2013.01)

(58) Field of Classification Search
CPC .... B65D 45/28; B65D 81/20; B65D 81/2038; B65D 39/12; B65D 53/00; B65D 45/327; B65D 51/14; B65D 43/02; B65D 45/02; A47J 47/02

USPC ....................................................... 220/256.1
See application file for complete search history.

(56) References Cited

U.S. PATENT DOCUMENTS

| | | | | |
|---|---|---|---|---|
| 8,479,941 | B2 * | 7/2013 | Matsumoto | B65D 39/12 215/359 |
| 9,096,365 | B2 * | 8/2015 | Kim | B65D 81/2038 |
| 2004/0155041 | A1 * | 8/2004 | Kwon | B65D 81/2038 220/212 |
| 2013/0240532 | A1 * | 9/2013 | Lu | B65D 39/12 220/378 |
| 2013/0292291 | A1 * | 11/2013 | Lui | B65D 81/20 206/524.8 |
| 2016/0257458 | A1 * | 9/2016 | Pentelovitch | B65D 45/32 |
| 2016/0368671 | A1 * | 12/2016 | Pentelovitch | B65D 39/12 |

* cited by examiner

*Primary Examiner* — Andrew Perreault

(57) ABSTRACT

A button-type airtight container lid having an upper lid, a lower lid, a dish seal ring, a button, a rotary toothed member, a vertical shaft, and a lever spring mechanism; the rotary toothed member includes a sleeve and N spline teeth provided at the top and bottom with a helicoid, respectively; the rotary toothed member is rotatably mounted at the vertical shaft fixed on the button; the upper lid being provided at the bottom plate with an N-groove spline hole, the bottom plate has an end gear at the bottom, which includes 2N end teeth; the tooth groove of the N-groove spline hole being located at the tooth groove section of the end tooth; the lower lid includes a 2N tooth end ratchet, whose ratchet tooth is adapted to the lower helicoid of the spline tooth, with N greater than or equal to 3.

8 Claims, 17 Drawing Sheets

BUTTON-TYPE AIRTIGHT CONTAINER AND THE LID THEREOF

BACKGROUND OF THE INVENTION

The present invention relates to an airtight container, particularly to a button-type airtight container and the lid thereof.

A crisper is a very convenient product that people often use in life, storing food in categories making people's health further guaranteed. The crisper is divided into three kinds: (1) a plastic crisper: being made of resin materials, having a general temperature-resistant range from −20° C. to 120° C.; (2) a tempered glass crisper: being made of common glass that is tempered; and (3) a heat-resistant glass crisper: being made of the borosilicate glass material.

Both a lunchbox and a crisper require high airtightness. A Korean lock&lock plastic crisper is a more common crisper with higher airtightness; however, the Korean lock&lock plastic crisper needs four buckles to buckle up, which makes the closing operation not convenient enough.

In order to solve this problem, a Chinese utility model patent (CN200920130787.8) discloses an airtight container, which comprises a container body and an outer lid disposed at the upper section of the container body; with a lever spring mechanism arranged inside the outer lid for airtightness, a lever, by being pushed with the key, drives an inner lid to move upward; and a seal ring undergoes compressive deformation under the action of the inner lid and outer lid, which brings the seal ring mounted on the inner lid into close contact with the edge of the container body, thus making the entire airtight container achieve high airtightness. The lever spring mechanism of this airtight container is driven by a key through a hinge rod, with the hinge rod difficult to be assembled to the lever. In the process of assembling and buckling up the button, i.e. in an installation environment with poor visibility, the hinge rod is prone to deviate from the connection post; if the hinge rod cannot enter the restoring buckling groove in the connection post smoothly, the button is prone to suffer such defects as installation failure and poor pop-up effect. Besides, the inner lid and the seal ring of this airtight container have a sectional structure, with the seal ring embedded in the groove of the inner lid, leaving a corner or spot that is hard to clean. The seal ring and the groove of the inner lid are prone to keep dirt to breed bacteria.

BRIEF SUMMARY OF THE INVENTION

The technical problem to be solved by the present invention is to provide a button-type airtight container lid that has easy assembly, high reliability, and stable operational performance.

The technical problem to be further solved by the present invention is to provide a button-type airtight container lid that is easy to clean and not prone to keep dirt at its seal ring section.

Another technical problem to be solved by the present invention is to provide a button-type airtight container that has an easily assembled lid, high airtight reliability, and stable performance.

In order to solve the above technical problems, the present invention adopts the following technical solution: A button-type airtight container lid is provided, comprising an upper lid, a lower lid, a dish seal ring, a button, a rotary toothed member, a vertical shaft and a lever spring mechanism, the button being mounted in a button hole of the upper lid, the dish seal ring being fixed at the periphery of the lower lid; the rotary toothed member includes a sleeve and N spline teeth, the spline teeth being provided at the top and bottom with a helicoid, respectively, with the upper helicoid and the lower helicoid rotating in the opposite direction; the rotary toothed member is rotatably mounted at the lower section of the vertical shaft, with the upper end of the vertical shaft fixed on the button; the button hole of the upper lid is provided at the lower section with a bottom plate, which includes an N-groove spline hole, whose tooth groove has a width adapted to the spline tooth; the bottom plate is provided at the bottom with an end gear, which includes 2N end teeth, whose tooth groove is adapted to the top of the spline tooth, with the tooth groove of the N-groove spline hole located at the tooth groove section of the end tooth; the lower lid includes a 2N-tooth end ratchet, whose ratchet tooth is adapted to the lower helicoid of the spline tooth, with N greater than or equal to 3.

In the button-type airtight container lid as described above, the lower lid includes a 2N-groove spline hole, the axial top surface of the spline tooth of which includes a helicoid adapted to the lower helicoid of the spline tooth, thus forming the end ratchet, with the tooth groove of the 2N-groove spline hole having a width adapted to the spline tooth; and the tooth groove of the N-groove spline hole offsets the tooth groove of the 2N-groove spline hole in the circumferential direction.

In the button-type airtight container lid as described above, with N equal to 3, the tooth groove of the end gear is V-shaped, and the top of the spline tooth is Λ-shaped; the tooth groove of the 3-groove spline hole, located at the groove bottom section of the V-shaped tooth groove of the end tooth, is ahead of the tooth groove of the 6-groove spline hole in the rotary direction of the rotary toothed member by 10°-20°.

In the button-type airtight container lid as described above, the lever spring mechanism includes a central spring and two levers, the levers including a lever arm and a cam, the cam being provided at both ends in the axial direction with a rotary shaft, respectively; the lever arm is connected at the lower end with an end of the cam in the axial direction, and stretches out at the upper end along the radial direction of the cam; the lower lid includes two sets of brackets, each of the sets including two vertical plates; the upper lid is provided at the bottom plate with 4 vertical plate holes, with the vertical plate going through the vertical plate holes from the bottom up; the vertical plate is provided at the upper end with a hinge hole, with the two rotary shafts of the cam inserted into the two hinge holes of the bracket, respectively; the central spring is arranged between the bottom plate of the upper lid and the lower lid, the upper end of the lever arm abuts against the button, and the profile of the cam abuts against the bottom plate of the upper lid.

In the button-type airtight container lid as described above, the lower lid comprises a bottom lid and a lever seat, the lever seat including a base and the two sets of brackets, the base being provided at the central section with the 2N-groove spline hole; and the bottom lid includes a bearing hole of the base, with the base buckled into the bearing hole.

In the button-type airtight container lid as described above, the lever arm is provided at the upper end with a cross arm; the two sets of brackets have their centers deviate from the central axis of container lid, respectively, centrosymmetric with respect to the axis of the vertical shaft.

In the button-type airtight container lid as described above, the dish seal ring is fixed at the edge of the lower lid by double-shot injection molding.

A button-type airtight container is provided, comprising a container body and a container lid, with the container lid being the button-type airtight container lid as described above.

In the above button-type airtight container, with the container lid provided at the top near the periphery with a groove, when two of the button-type airtight containers are stacked, the bottom of the container body of the button-type airtight container disposed above will enter the groove of the button-type airtight container lid disposed below.

The button-type airtight container lid of the present invention provides easy assembly, high reliability, and stable operational performance.

BRIEF DESCRIPTION OF THE DRAWINGS

The present invention will further be described below in detail with reference to drawings and embodiments.

DETAILED DESCRIPTION OF THE INVENTION

Figure 29:
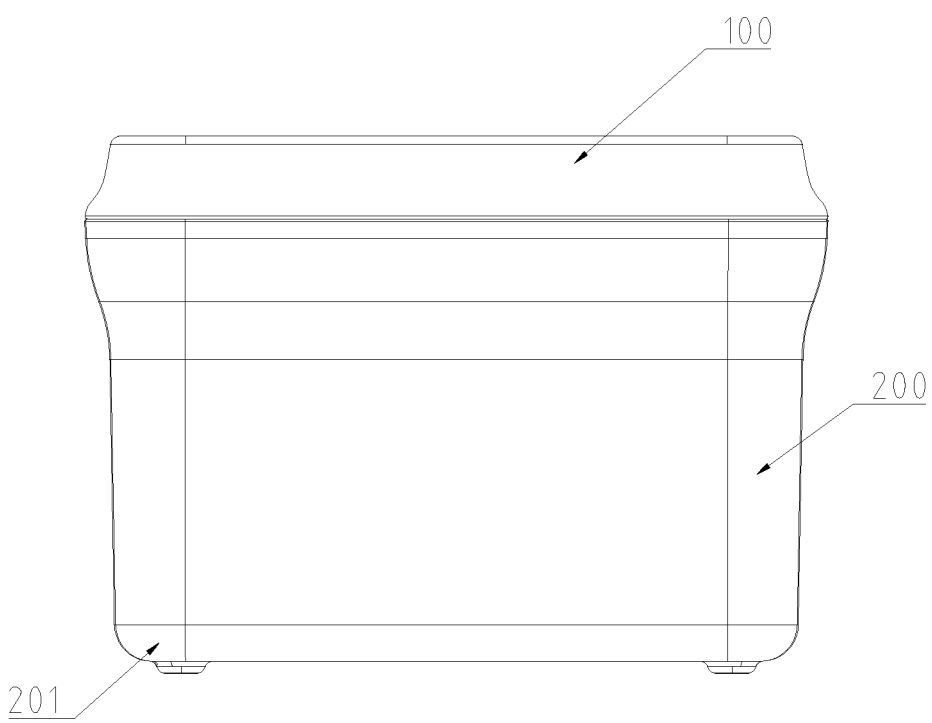
FIG. 29 is a front view of the button-type airtight container of the example of the present invention.

The structure of the button-type airtight container of the present invention is as shown in FIG. 29, comprising a container body 200 and a container lid 100.

The structure of the container lid 100 is as shown in FIGS. 1-28, comprising an upper lid 1, a lower lid, a dish seal ring 2, a button 3, a rotary toothed member 4, a mounting screw 5 as the vertical shaft of the rotary toothed member, and a lever spring mechanism.

The lower lid comprises a bottom lid 6 and a lever seat 7, with a dish seal ring 2 embedded non-detachably at the edge of the bottom lid 6 by double-shot injection molding.

The lever seat 7 includes a base 701 and two sets of brackets. Each set of the brackets includes two vertical plates 702, which have a hinge hole 703 at the upper end. The bottom lid 6 is provided at the central section with a bearing hole 601 of the base, in which is a slot 602. The base 701 is provided at the edge with a boss 704, which is screwed into the slot 602, thus buckling the base 701 into the bearing hole 601 of the bottom lid 6.

The two sets of brackets have their centers deviate from the central axis of container lid, respectively, centrosymmetric with respect to the axis of the mounting screw 5.

The lever spring mechanism includes a central spring 8 and two levers 9.

The levers 9 include a lever arm 902 and a cam 901, the cam 901 being provided at both ends in the axial direction with a rotary shaft 903, respectively; the lever arm 902 is connected at the lower end with an end of the cam 901 near the rotary shaft, and stretches out at the upper end along the radial direction of the cam 901; and the lever arm 902 is provided at the upper end with a cross arm 904.

The button 3, mounted in a button hole 101 of the upper lid 1, is provided at the lower section with a plurality of elastic hooks 301, and can move up and down after it is inserted into the button hole 101 without being released.

The upper lid 1 is provided below the button hole 101 with a bottom plate 102, which has 4 vertical plate holes 103, through which the vertical plate 702 goes from the bottom up, with the two rotary shafts 903 of the cam 901 inserted into the two hinge holes 703 of the bracket, respectively. The cross arm 904 at the upper end of the lever arm 902 abuts against the button 3, and the profile of the cam 901 abuts against the bottom plate 102 of the upper lid 1.

The central spring 8 has its upper end abutted against the bottom plate 102 and its lower end supported on the base 701 of the lower lid, with the lower lid and upper lid separated from each other under the action of the elastic force of the central spring 8.

The button 3 is provided at the central section with a downwardly extending cylindrical platform 302, which is provided inside with a threaded hole 303, into which is screwed the upper end of the mounting screw 5. The rotary toothed member 4 is loosely fitted over the mounting screw 5, facilitating rotation. The head of the mounting screw 5 and the cylinder platform 302 limit the axial movement of the rotary toothed member 4 with respect to the button 3.

The rotary toothed member 4 includes a sleeve 401 and 3 spline teeth 402, with the spline teeth 402 having a helicoid 403 at the bottom. The spline tooth 402, A-shaped at the top, is provided at the top right with a helicoid 404, with the lower helicoid 403 clockwise and the upper helicoid 404 counterclockwise.

The bottom plate 102 is provided at the central section with a 3-groove spline hole 107, whose tooth groove 106 has a width adapted to the width of the spline tooth 402 of the rotary toothed member 4, thus achieving sliding fit between the 3-groove spline hole 107 and the spline tooth 402 of the rotary toothed member 4.

The bottom plate 102 is provided at the bottom with an end gear 104, which has 6 end teeth; the tooth groove of the end gear 104 is V-shaped, which is adapted to the shape of the top of the spline tooth 402.

The tooth groove of the 3-groove spline hole 107 is located at the groove bottom section of the V-shaped tooth groove of the end tooth.

The base 701 of the lever seat of the lower lid is provided at the central section with a 6-groove spline hole 705, the axial top 706 of the spline tooth of which is a clockwise helicoid, with the helicoid 706 having the same helical angle with the lower helicoid of the spline tooth 402; the tooth groove 707 of the 6-groove spline hole 705 has a width adapted to the width of the spline tooth 402, thus achieving sliding fit between the 6-groove spline hole 705 and the spline tooth 402; the tooth groove of the 3-groove spline hole 107 offsets the tooth groove of the 6-groove spline hole 705 in the circumferential direction, with the tooth groove of the 3-groove spline hole 107 ahead of the tooth groove of the 6-groove spline hole 705 in the rotary direction of the rotary toothed member 4 by 15°.

With the tooth groove of the 6-groove spline hole 705 providing downward space for the spline tooth 402, if the helical angle at the bottom of the spline tooth 402 is big enough, the tooth groove of the spline hole 705 can be omitted, i.e. the 6-groove spline hole 705 can be replaced by the 6-tooth end ratchet.

There can also be 4-5 spline teeth 402 of the rotary toothed member 4, and here the spline hole and the tooth of the end gear should be increased correspondingly in number.

Figure 1:
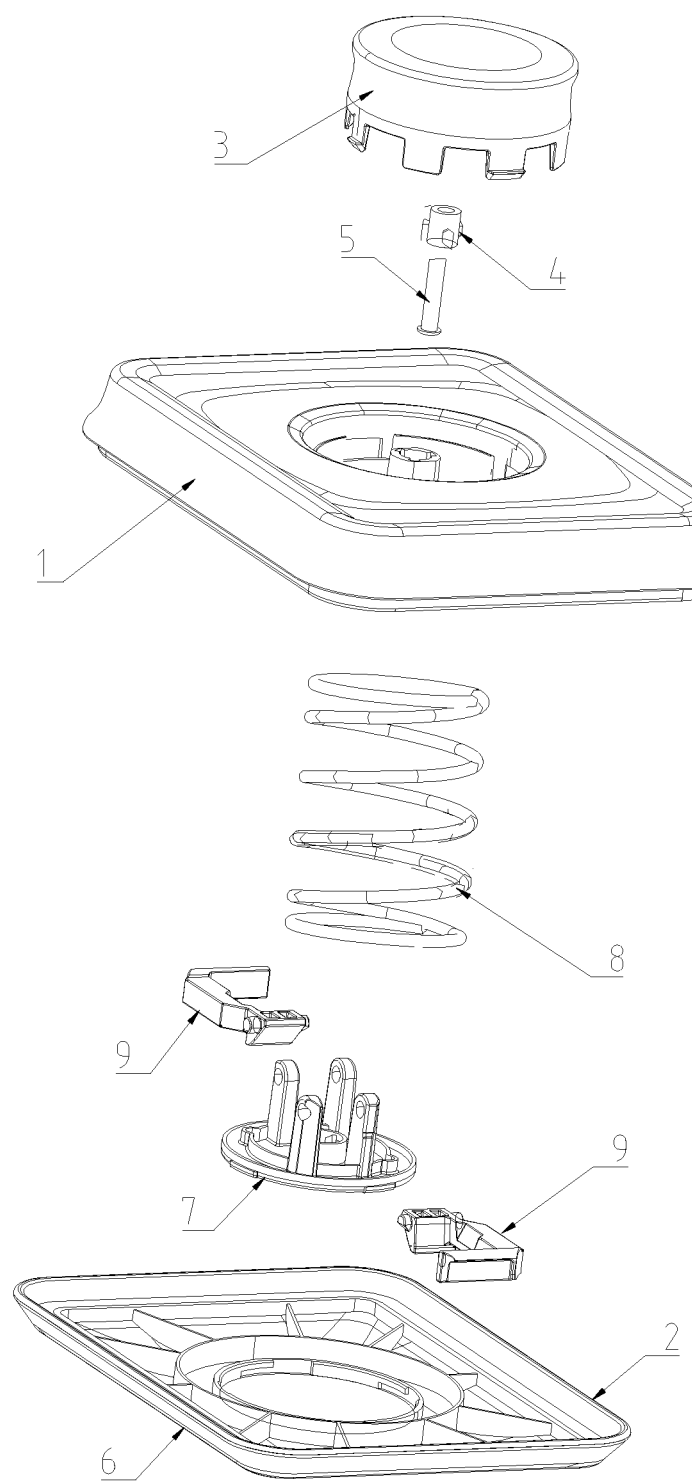
FIG. 1 is an exploded view of the button-type airtight container lid of the example of the present invention.
Figure 2:
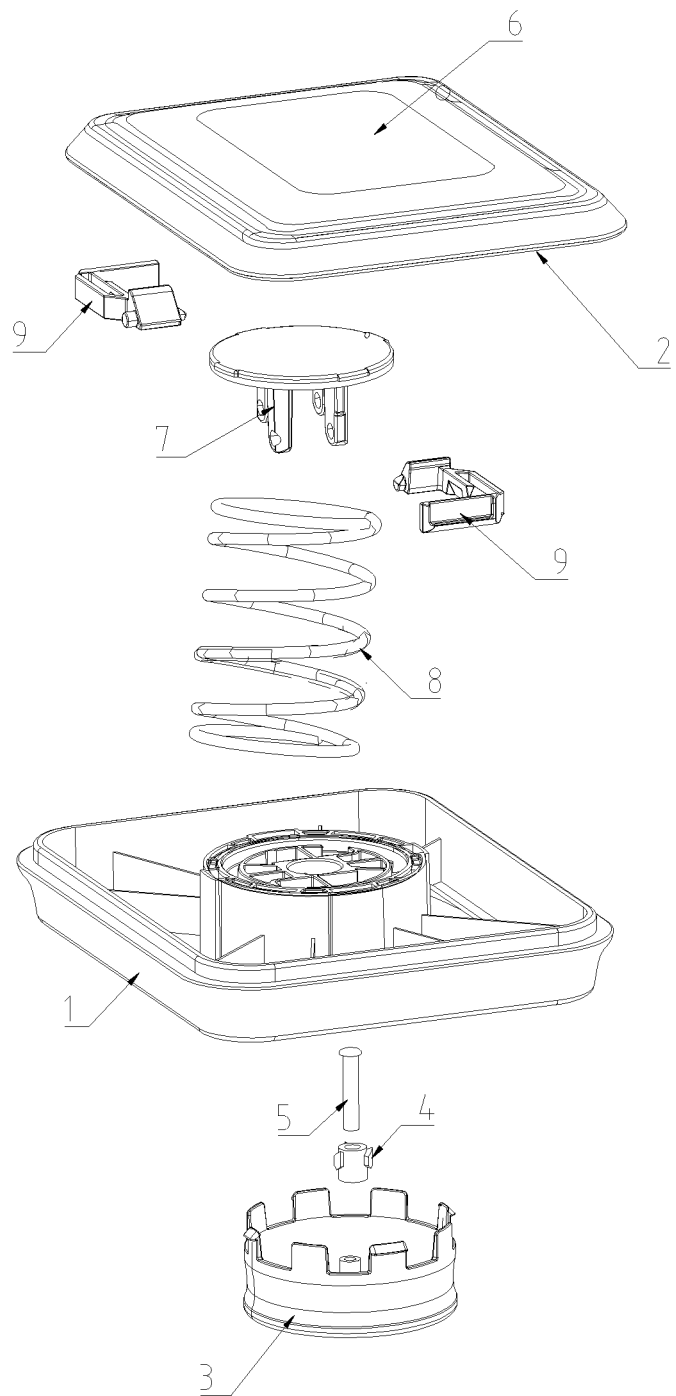
FIG. 2 is an exploded view of the button-type airtight container lid of the example of the present invention from another perspective.
Figure 3:
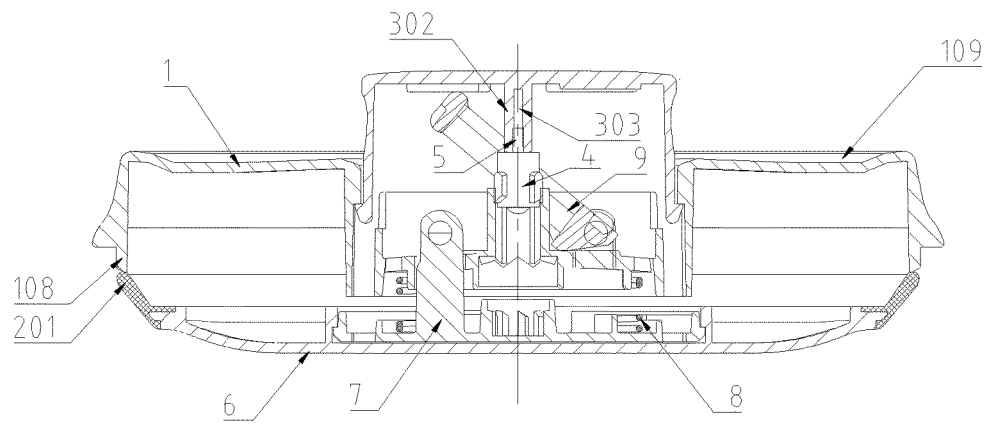
FIG. 3 is a cross-sectional view of the button-type airtight container lid of the example of the present invention where the button is not pressed.
Figure 4:
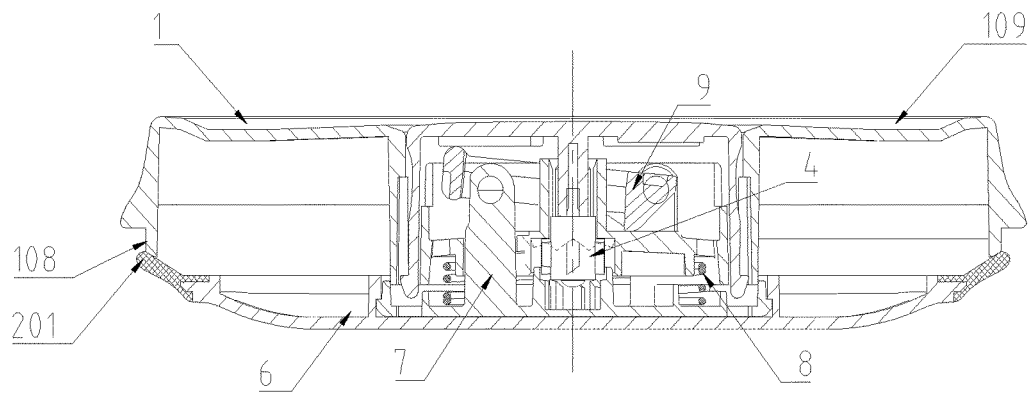
FIG. 4 is a cross-sectional view of the button-type airtight container lid of the example of the present invention where the button is pressed.

When the button 3 is pressed, as shown in FIGS. 3 and 4, the button 3 pushes the lever arm 902 downward, the cam 901 rotates around the hinge hole 703 of the vertical plate 702, pulling the upper lid upward while pushing the upper lid 1 downward, thus shortening the distance between them and making the central spring 8 compressed. Meanwhile, the edge 108 of the upper lid 1 pushes the ring edge 201 of the dish seal ring 2 downward, which makes the ring edge 201 of the dish seal ring 2 open, forming a seal with the inner hole at the upper edge of the container body 200.

Figure 5:
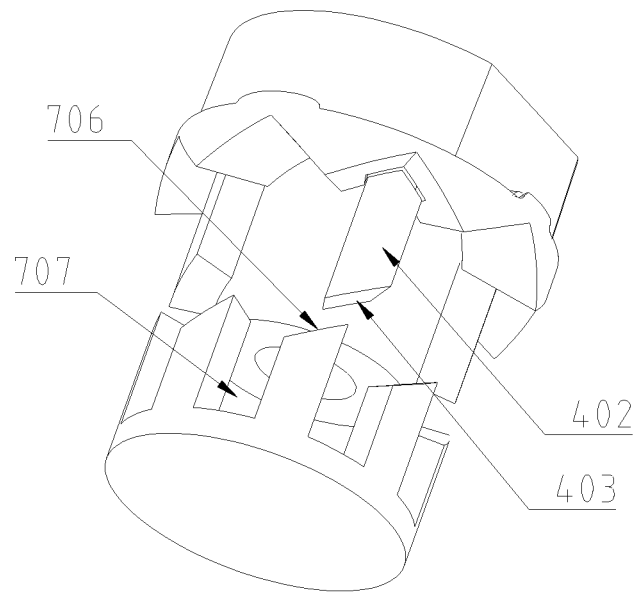
FIG. 5 is the first schematic view of the working status of the rotary toothed member of the example of the present invention.
Figure 6:
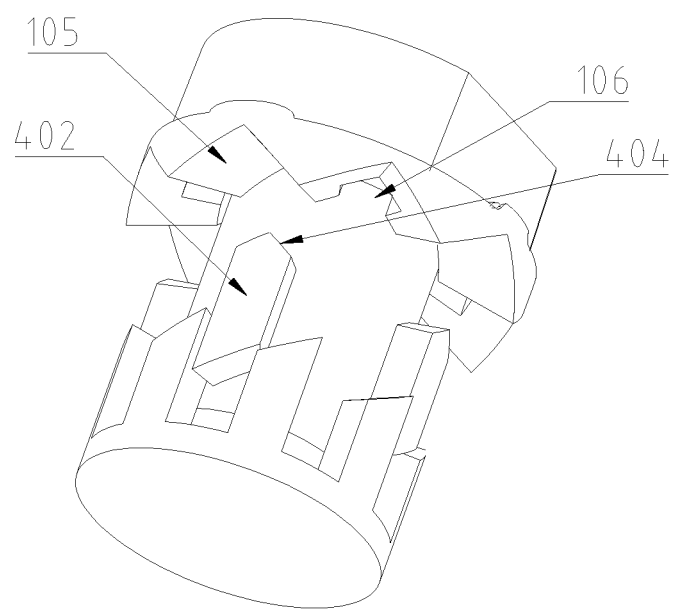
FIG. 6 is the second schematic view of the working status of the rotary toothed member of the example of the present invention.

As shown in FIG. 5, when the button 3 is pressed, the rotary toothed member 4 slides downward along the tooth groove 106 of the 3-groove spline hole 107; after the spline tooth 402 of the rotary toothed member 4 leaves the tooth groove 106, the helicoid 403 at the bottom of the spline tooth 402 comes into contact with the axial top 706 of the spline tooth of the 6-groove spline hole 705; when the rotary toothed member 4 continues to move downward with the button 3, it rotates along the helicoid 706, entering the spline groove 707 of the spline hole 705, as shown in FIG. 6.

Figure 7:
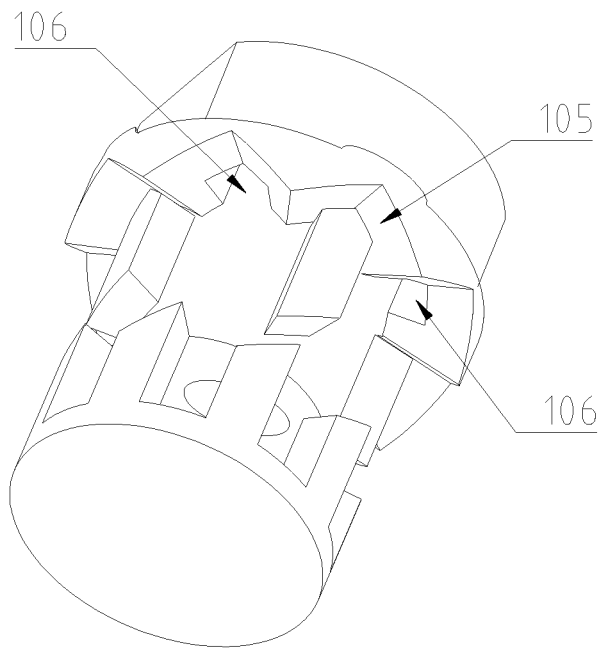
FIG. 7 is the third schematic view of the working status of the rotary toothed member of the example of the present invention.

Here the button 3 is released, and the rotary toothed member 4 moves upward under the action of the resilience force of the central spring. With the rotary toothed member 4 having been rotated, when moving backward, the top end of the spline tooth 402 enters the V-shaped tooth groove 105 of the end gear 104, and the helicoid 404 at the top right of the spline tooth 402 comes into contact with the counter-clockwise helicoid of the end gear 104, with the spline tooth 402 continuing to rotate while rising until the top end of the spline tooth 402 completely enters the V-shaped tooth groove 105 of the end gear 104, as shown in FIG. 7. The end gear 104 has 5 V-shaped tooth grooves 105 in total, 3 of which are not in communication with the tooth groove 106 of the 3-groove spline hole 107. After the top end of the spline tooth 402 completely enters the V-shaped tooth groove 105 of the end gear 104, the spline tooth 402 gets stuck, as shown in FIG. 4, and the ring edge 201 of the dish seal ring 2 is kept in an open position, forming a good seal with the inner hole at the upper edge of the container body 200.

Figure 8:
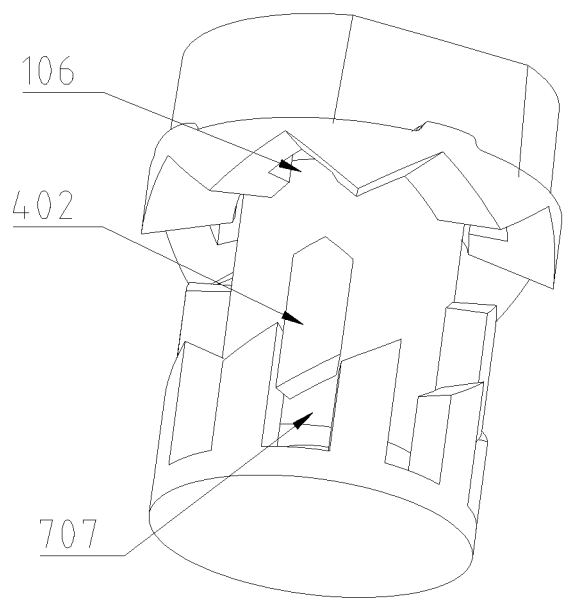
FIG. 8 is the fourth schematic view of the working status of the rotary toothed member of the example of the present invention.
Figure 9:
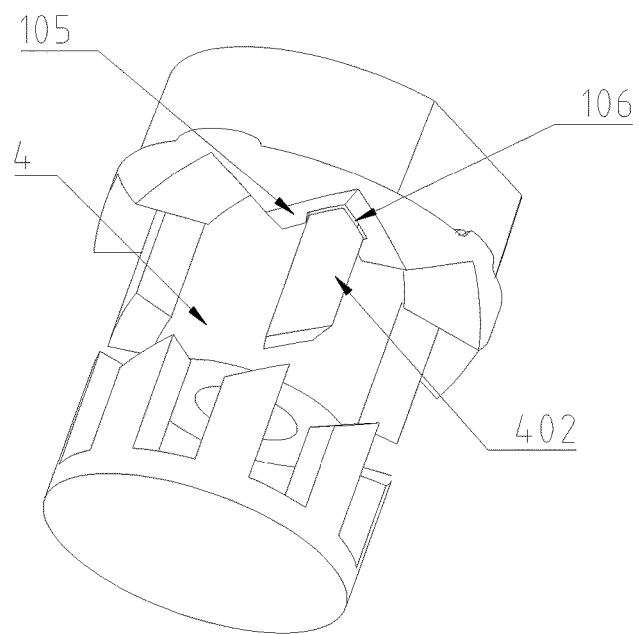
FIG. 9 is the fifth schematic view of the working status of the rotary toothed member of the example of the present invention.
Figure 10:
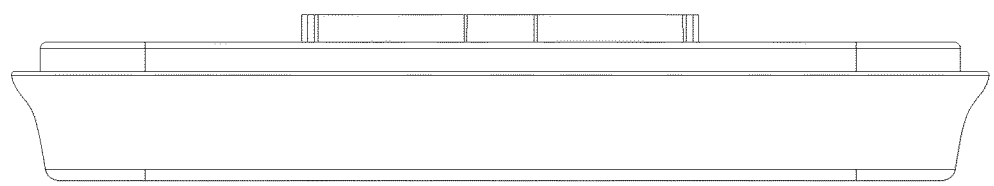
FIG. 10 is a front view of the upper lid of the example of the present invention.
Figure 11:
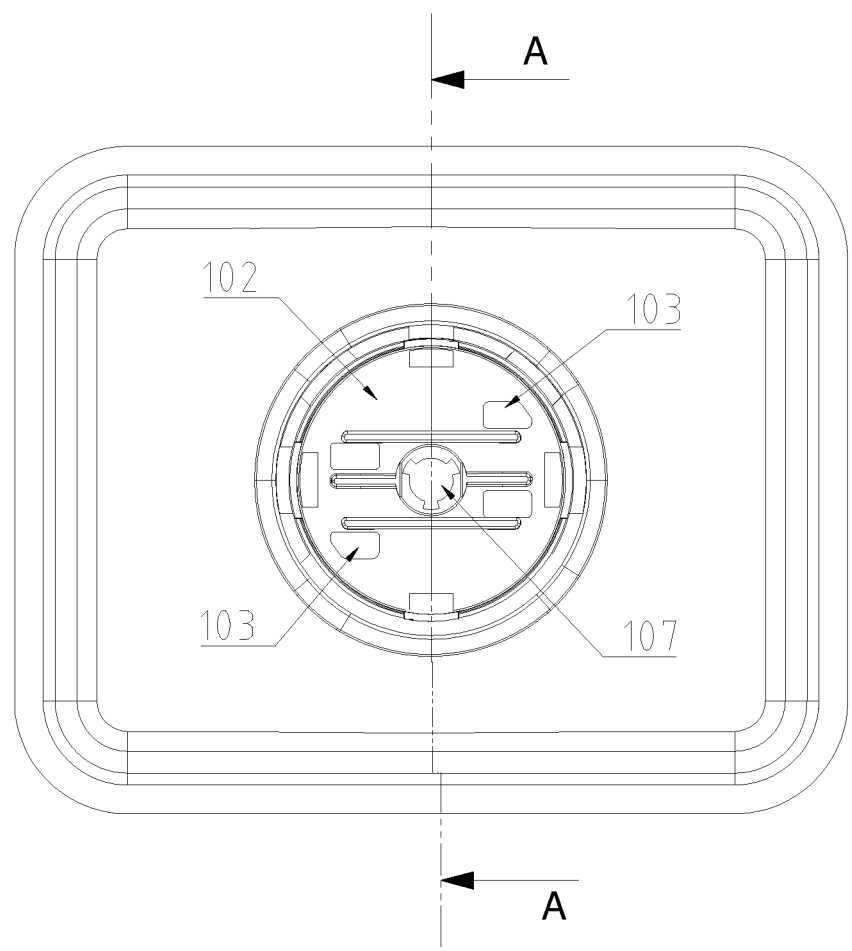
FIG. 11 is a top view of the upper lid of the example of the present invention.
Figure 12:
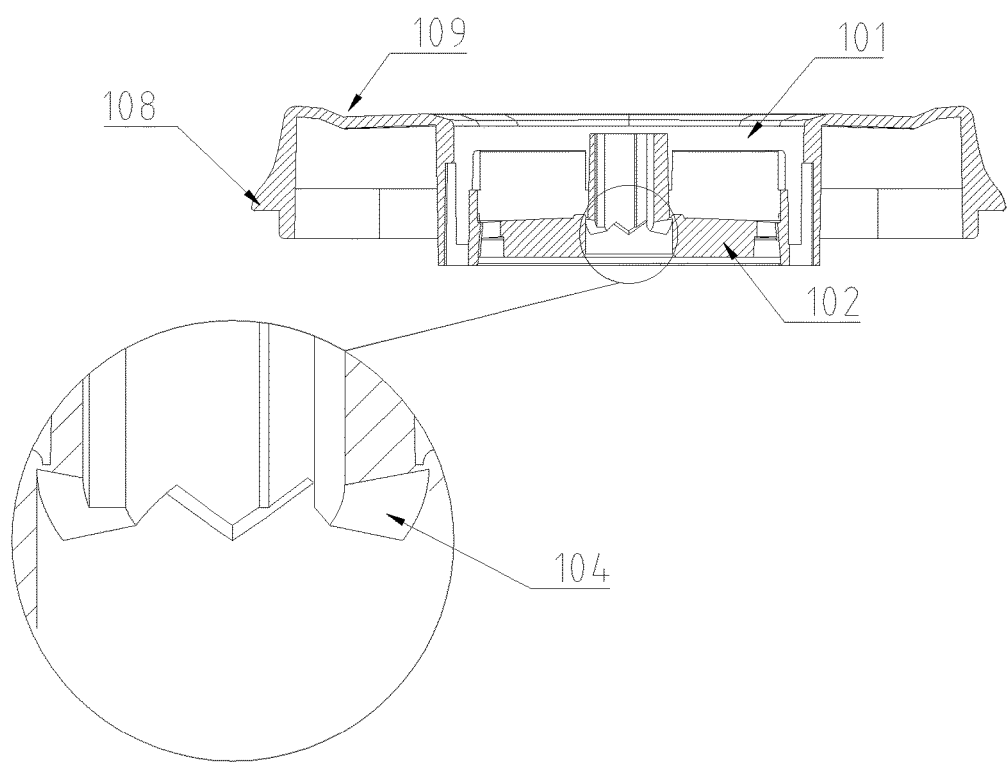
FIG. 12 is a rotated cross-sectional view of FIG. 11 in the A direction.
Figure 13:
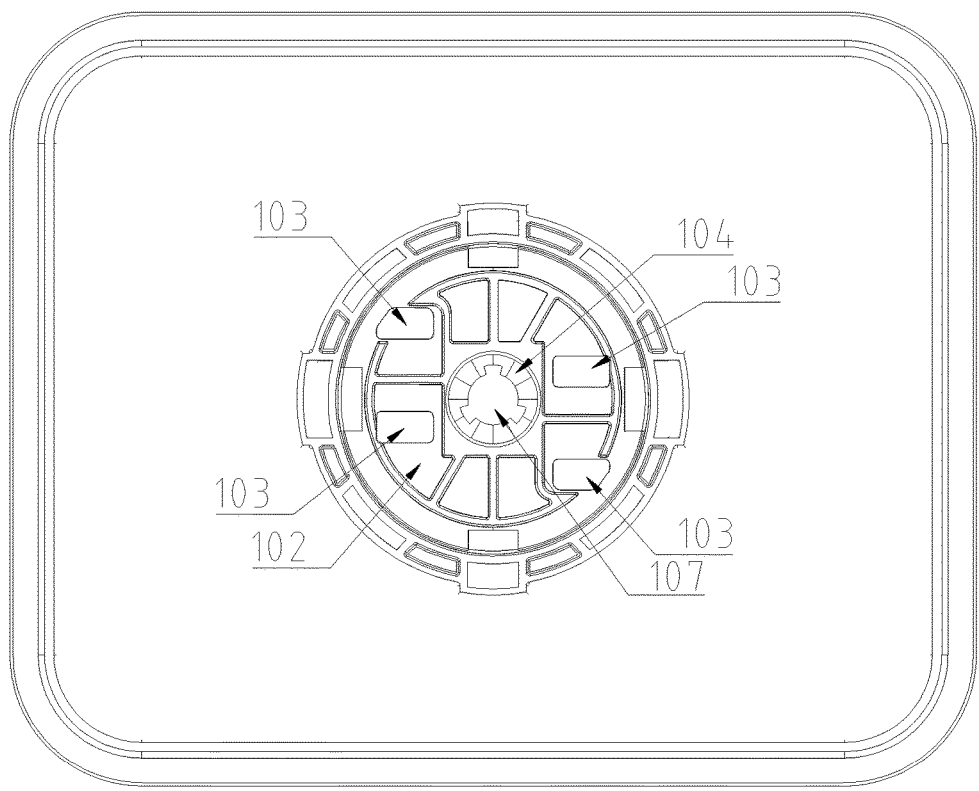
FIG. 13 is a bottom view of the upper lid of the example of the present invention.
Figure 14:
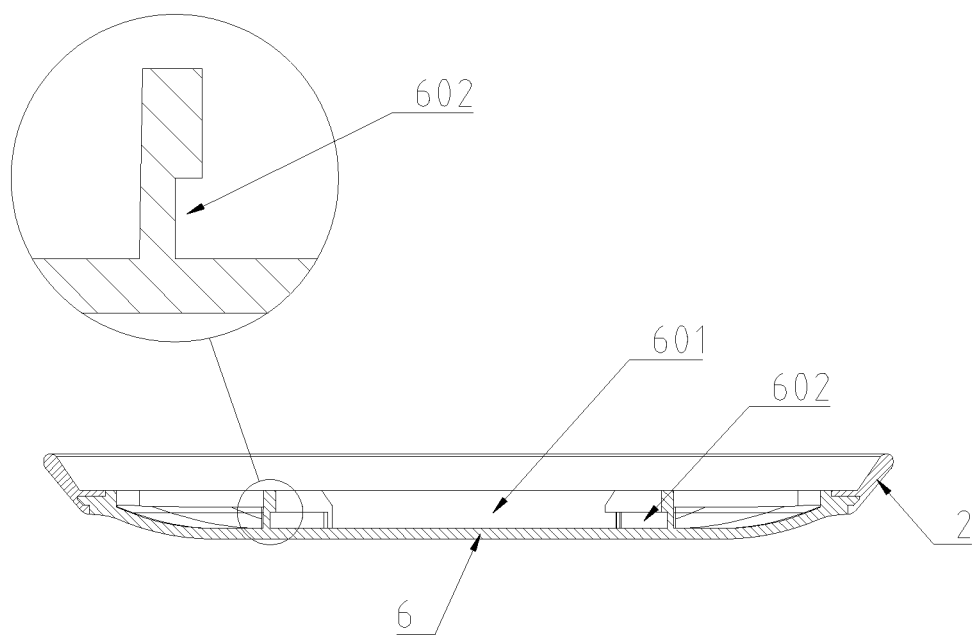
FIG. 14 is a cross-sectional view of the bottom lid assembly of the example of the present invention.
Figure 15:
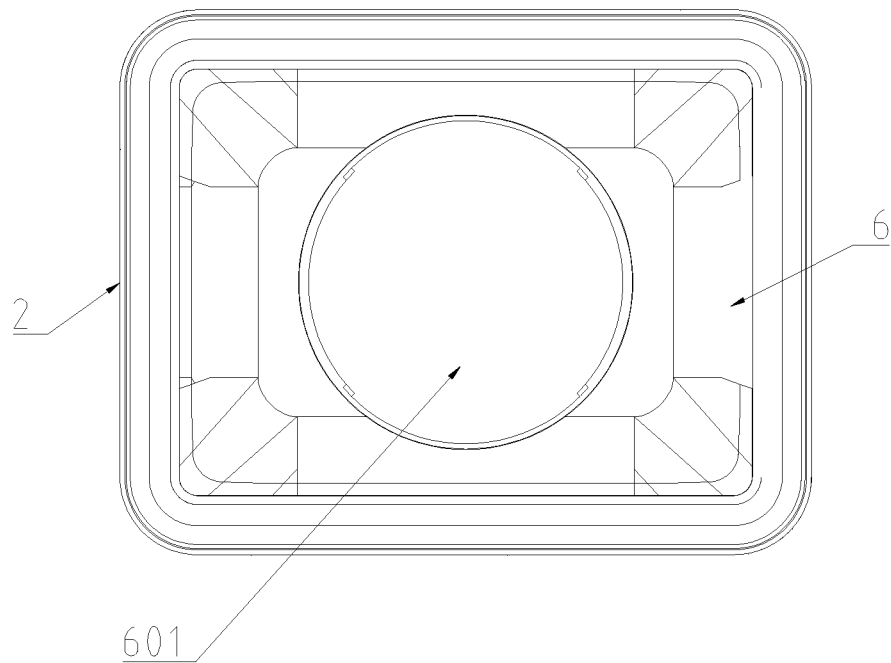
FIG. 15 is a top view of the bottom lid assembly of the example of the present invention.
Figure 16:
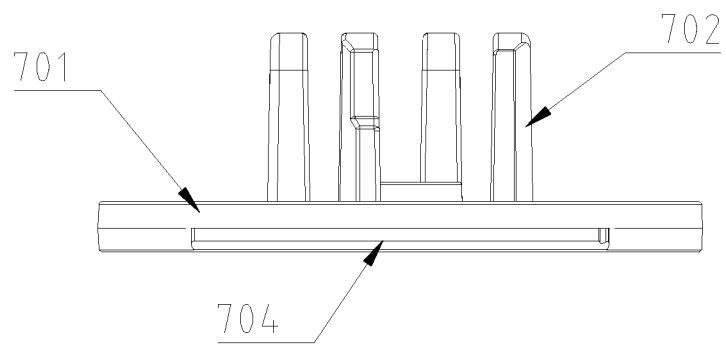
FIG. 16 is a front view of the lever seat of the example of the present invention.
Figure 17:
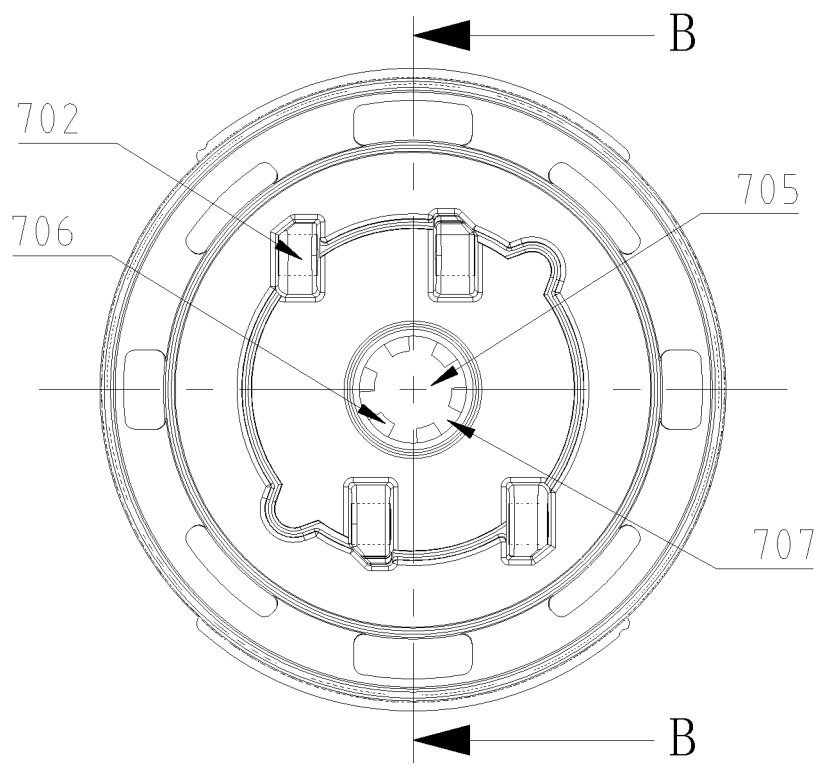
FIG. 17 is a top view of the lever seat of the example of the present invention.
Figure 18:
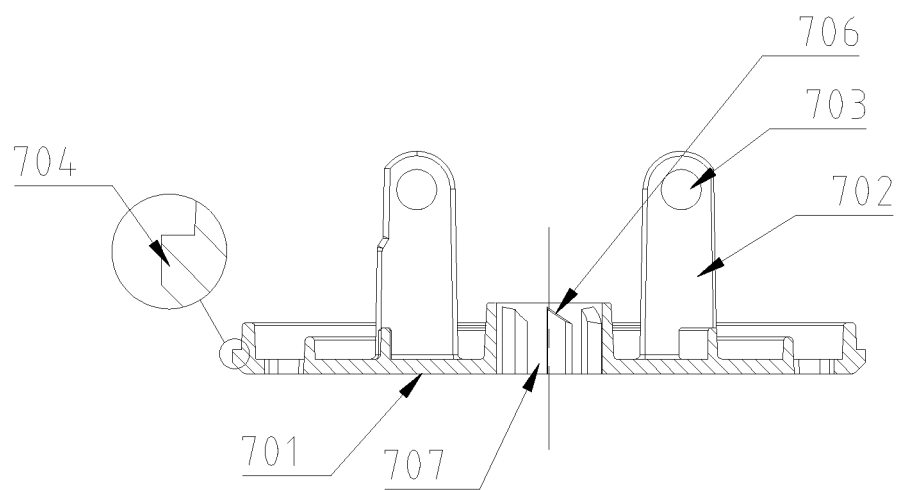
FIG. 18 is a cross-sectional view of FIG. 17 in the B direction.
Figure 19:
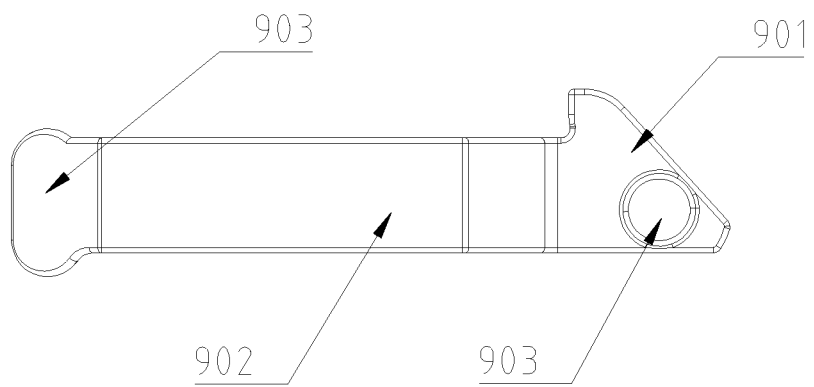
FIG. 19 is a front view of the lever of the example of the present invention.
Figure 20:
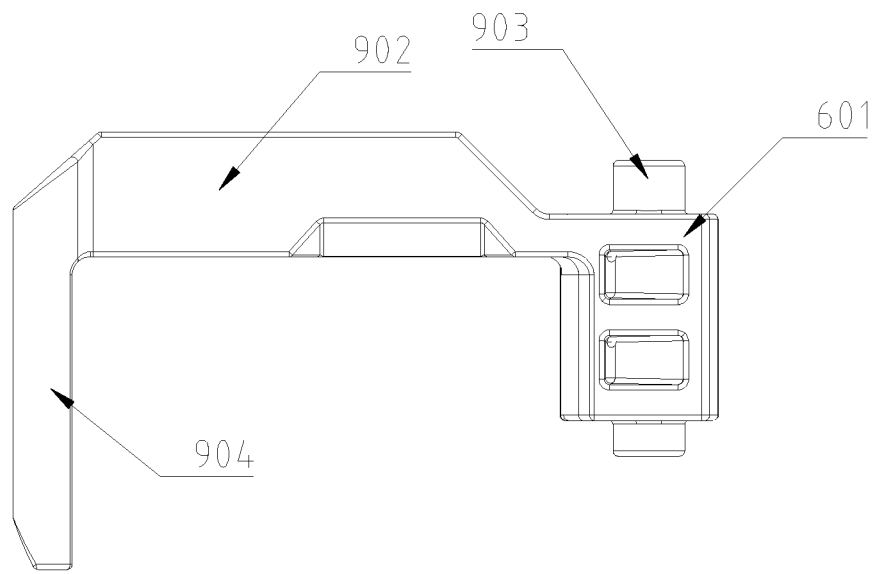
FIG. 20 is a top view of the lever of the example of the present invention.
Figure 21:
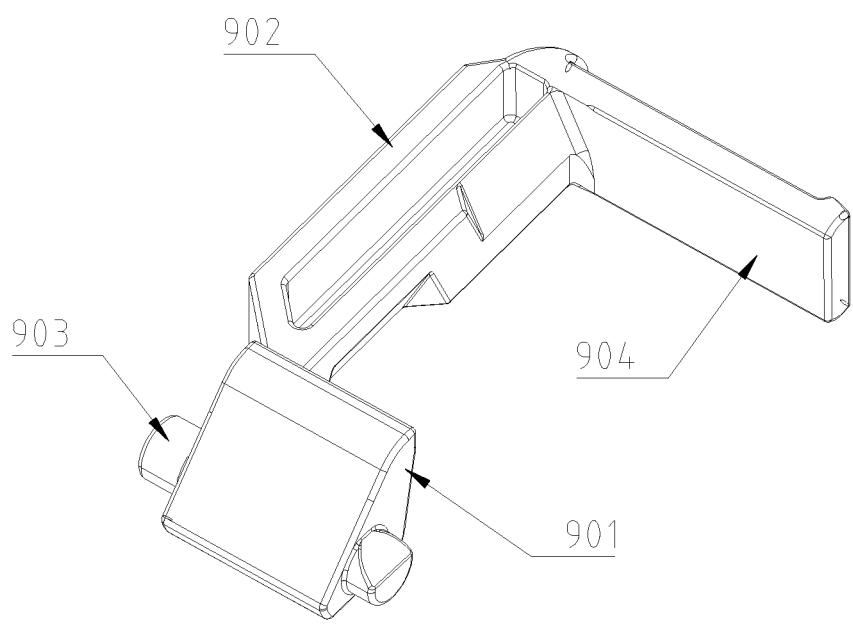
FIG. 21 is a stereoscopic view of the lever of the example of the present invention.
Figure 22:
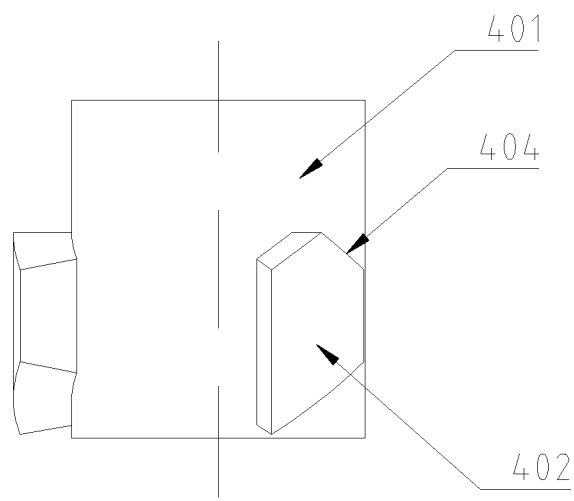
FIG. 22 is a front view of the rotary toothed member of the example of the present invention.
Figure 23:
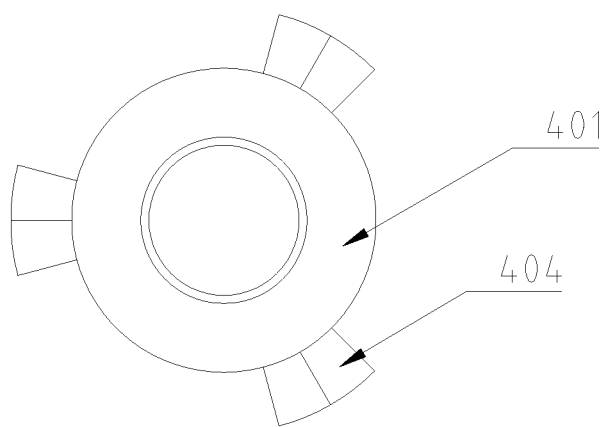
FIG. 23 is a top view of the rotary toothed member of the example of the present invention.
Figure 24:
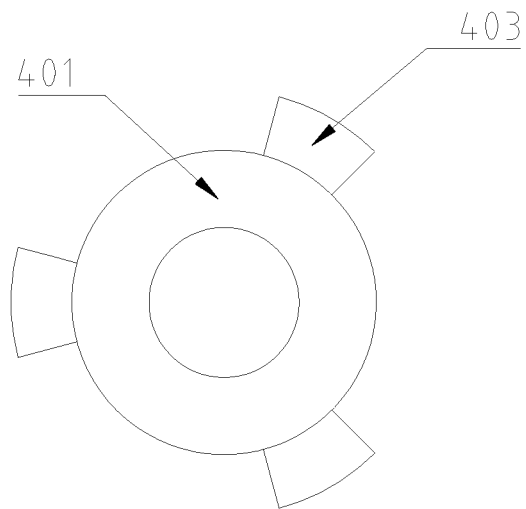
FIG. 24 is a bottom view of the rotary toothed member of the example of the present invention.
Figure 25:
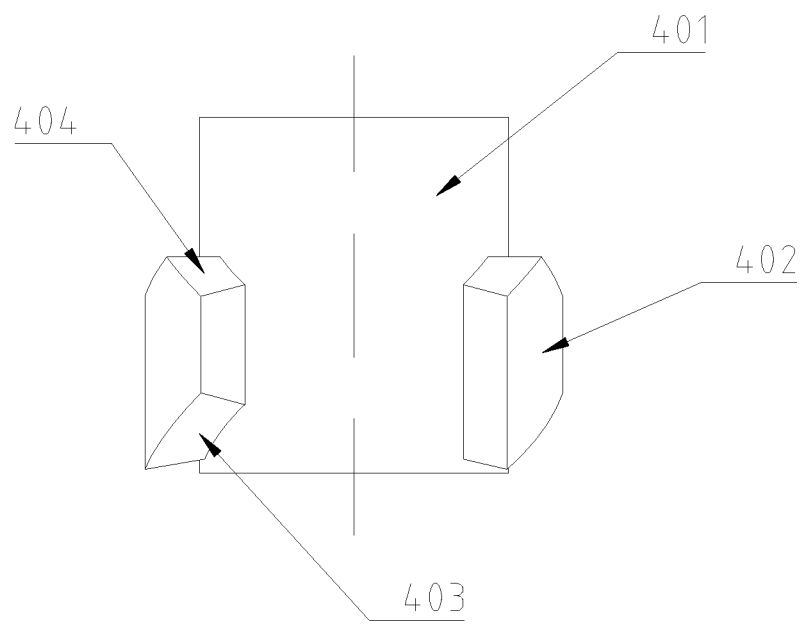
FIG. 25 is a right view of the rotary toothed member of the example of the present invention.
Figure 26:
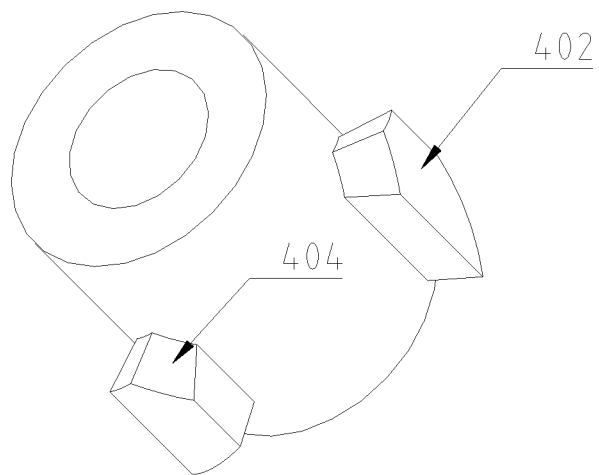
FIG. 26 is a stereoscopic view of the rotary toothed member of the example of the present invention.
Figure 27:
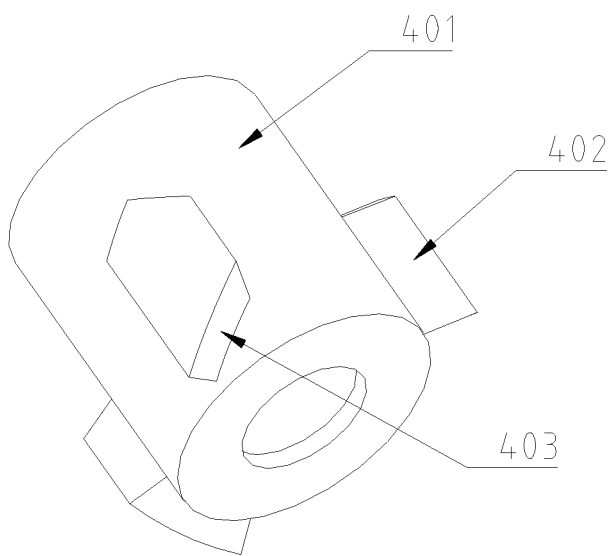
FIG. 27 is a stereoscopic view of the rotary toothed member of the example of the present invention from another perspective.
Figure 28:
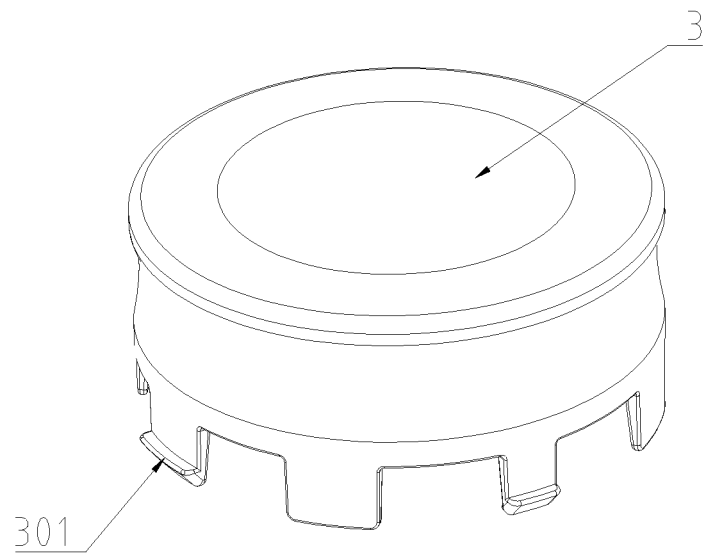
FIG. 28 is a stereoscopic view of the button of the example of the present invention.

When the container lid 200 needs to be opened, the button 3 is pressed again, as shown in FIG. 8, and the rotary toothed member 4 continues to rotate forward while moving downward, with the spline tooth 402 entering a front spline groove 707 of the spline hole 705. Here the button 3 is released, and the rotary toothed member 4 moves upward under the action of the resilience force of the central spring. With the rotary toothed member 4 having been rotated, when moving backward, the top end of the spline tooth 402 enters a front V-shaped tooth groove 105 of the end gear 104, with the V-shaped tooth groove 105 in communication with the tooth groove 106 of the 3-groove spline hole 107 and not seizing the spline tooth 402; with the spline tooth 402 moving upward along the tooth groove 106, the upper lid 1 gets separated from the lower lid under the action of the resilience force of the central spring 8, and the ring edge 201 of the dish seal ring 2 retracts to get away from the inner hole of the upper edge of the container body 200.

With the container lid 100 provided at the top near the periphery with a groove 109, when two of the button-type airtight containers are stacked, the bottom 201 of the container body 200 of the button-type airtight container disposed above will enter the groove 109 of the button-type airtight container lid 100 disposed below, facilitating stacked storage of a plurality of button-type airtight containers.

The above examples of the present invention have the following beneficial effects:

1. The button-type airtight container lid of the present invention provides easy assembly, high reliability, and stable operational performance; the container lid, having a detachable structure, facilitates cleaning and maintenance; the driving structure of the button is simple and easy to handle, eliminating the need for tedious operation of opening and closing the lid, facilitating storage of the articles to be sealed.

2. With a dish seal ring 2 embedded non-detachably at the edge of the bottom lid 6 by double-shot injection molding, there is neither a gap between them nor a corner or spot hard to be cleaned, not prone to keep dirt, easy to be cleaned, healthy and safe.

What is claimed is:

1. A button-type airtight container lid, comprising an upper lid, a lower lid, a dish seal ring, a button and a lever spring mechanism, the button is mounted in a button hole of the upper lid, the dish seal ring is fixed at a periphery of the lower lid, wherein the button-type airtight container lid also comprises a rotary toothed member and a vertical shaft; the rotary toothed member comprises a sleeve and spline teeth, a quantity of the spline teeth is N wherein N is three; a top and a bottom side of each spline tooth of the spline teeth is respectively provided with an inclined sliding surface; the inclined sliding surface at the top side and the inclined sliding surface at the bottom side are oriented to opposite directions; the rotary toothed member is rotatably mounted at a lower section of the vertical shaft, with an upper end of the vertical shaft fixed on the button; a lower section of the button hole of the upper lid is provided with a bottom plate; the bottom plate comprises an N-groove spline hole; each tooth groove of the N-groove spline hole has a width matching with a width of each spline tooth of the rotary toothed member; a bottom side of the bottom plate is provided with an end gear; the end gear comprises 2N end teeth; each tooth groove of the end gear is shaped corresponding to a shape of the top side of each spline tooth of the rotary toothed member; each said tooth groove of the N-groove spline hole is located at a respective tooth groove of the end gear; the lower lid comprises a 2N-groove spline hole; an axial top surface of each spline tooth of the 2N-groove spline hole comprises an inclined sliding surface shaped corresponding to a shape of the inclined sliding surface at the bottom side of each spline tooth of the rotary toothed member; each tooth groove of the 2N-groove spline hole has a width matching with the width of each said spline tooth of the rotary toothed member; each said tooth groove of the N-groove spline hole offsets each corresponding tooth groove of the 2N-groove spline hole in a circumferential direction of the rotary toothed member.

2. The button-type airtight container lid according to claim 1, wherein each said tooth groove of the end gear is V-shaped, and the top side of each spline tooth of the rotary toothed member is A-shaped; each said tooth groove of the N-groove spline hole, located at a groove bottom part of the respective tooth groove of the end gear, offsets each said corresponding tooth groove of the 2N-groove spline hole in said circumferential direction of the rotary toothed member by 10°-20°.

3. The button-type airtight container lid according to claim 1, wherein the lever spring mechanism comprises a central spring and two levers, each of the levers comprises a lever arm and a cam, both ends of the cam are respectively provided with a rotary shaft in an axial direction, a lower end of the lever arm is connected with an end of the cam in the axial direction, and an upper end of the lever arm stretches out along a radial direction of the cam; the lower lid comprises two sets of brackets, each of the sets comprises two vertical plates; the upper lid is provided at the bottom plate with 4 vertical plate holes; the vertical plates pass through the vertical plate holes from below the vertical plate holes; an upper end of each of the vertical plates is provided with a hinge hole; the two rotary shafts at both ends of each said cam are inserted into the two hinge holes of the two vertical plates of a respective set of brackets; the central spring is arranged between the bottom plate of the upper lid and the lower lid; the upper end of each said lever arm abuts against the button, and a profile of each said cam abuts against the bottom plate of the upper lid.

4. The button-type airtight container lid according to claim 3, wherein the lower lid comprises a bottom lid and a lever seat, the lever seat comprises a base and the two sets of brackets, a central section of the base is provided with the 2N-groove spline hole; and the bottom lid comprises a bearing hole of the base; the base is buckled into the bearing hole.

5. The button-type airtight container lid according to claim 3, wherein each said lever arm is provided at the upper end with a cross arm; the two sets of brackets have their centers deviated from a central axis of the button-type airtight container lid; the centers of the two sets of brackets are centrosymmetric with respect to an axis of the vertical shaft.

6. The button-type airtight container lid according to claim 1, wherein the dish seal ring is fixed at an edge of the lower lid by double-shot injection molding.

7. A button-type airtight container, comprising a container body and a container lid, wherein the container lid is the button-type airtight container lid according to claim 1.

8. The button-type airtight container according to claim 7, wherein a groove is provided at a top side of the container lid at a position proximal to a periphery of the top side of the container lid; the groove receives a bottom side of a container body of another button-type airtight container of the same type as the button-type airtight container when said another button-type airtight container is stacked above the button-type airtight container.

* * * * *